(12) United States Patent
Shida et al.

(10) Patent No.: US 11,186,236 B2
(45) Date of Patent: Nov. 30, 2021

(54) SHEET FOR INTERIOR OR EXTERIOR MATERIALS FOR AUTOMOBILES AND METHOD FOR PRODUCING SAME

(71) Applicant: SUMINOE TEXTILE CO., LTD., Osaka (JP)

(72) Inventors: Masaharu Shida, Shiga (JP); Shuichi Yonezawa, Osaka (JP); Yoshinobu Nochika, Nara (JP); Takuma Moriguchi, Shiga (JP)

(73) Assignee: SUMINOE TEXTILE CO., LTD., Osaka (JP)

( * ) Notice: Subject to any disclaimer, the term of this patent is extended or adjusted under 35 U.S.C. 154(b) by 479 days.

(21) Appl. No.: 15/999,619

(22) PCT Filed: Feb. 9, 2017

(86) PCT No.: PCT/JP2017/004684
§ 371 (c)(1),
(2) Date: Aug. 20, 2018

(87) PCT Pub. No.: WO2017/141801
PCT Pub. Date: Aug. 24, 2017

(65) Prior Publication Data
US 2020/0262363 A1    Aug. 20, 2020

(30) Foreign Application Priority Data
Feb. 19, 2016 (JP) .............. JP2016-029866

(51) Int. Cl.
*B60R 13/02* (2006.01)
*B32B 5/24* (2006.01)
(Continued)

(52) U.S. Cl.
CPC .............. *B60R 13/02* (2013.01); *B32B 5/245* (2013.01); *B32B 27/12* (2013.01); *B32B 27/32* (2013.01); *B60R 13/0815* (2013.01)

(58) Field of Classification Search
CPC ..... B60R 13/02; B60R 13/0815; B32B 5/245; B32B 27/12; B32B 27/32
(Continued)

(56) References Cited

U.S. PATENT DOCUMENTS

| | | | | |
|---|---|---|---|---|
| 5,258,089 A | * | 11/1993 | Tanaka | B29C 43/203 156/324.4 |
| 6,345,688 B1 | * | 2/2002 | Veen | G10K 11/162 181/290 |

(Continued)

FOREIGN PATENT DOCUMENTS

| | | |
|---|---|---|
| JP | 2000-264255 A | 9/2000 |
| JP | 2003-225959 A | 8/2003 |
| JP | 2015-205688 A | 11/2015 |

OTHER PUBLICATIONS

International Search Report for PCT/JP2017/004684 dated Apr. 4, 2017.
(Continued)

*Primary Examiner* — Forrest M Phillips
(74) *Attorney, Agent, or Firm* — Millen, White, Zelano & Branigan, PC; Ryan Pool

(57) ABSTRACT

A sheet for an automobile interior/exterior material provides excellent sound absorption performance. A sheet for an automobile interior/exterior material, which comprises a nonwoven fabric layer in which a fiber weight is 220 g/m² to 1,000 g/m² and an olefin resin layer laminated on one surface of the nonwoven fabric layer. The formation amount of the olefin resin layer is within a range from 100 g/m² to 500 g/m², the melt flow rate of the olefin resin is within a range from 1 g/10 minutes to 90 g/10 minutes. The nonwo-
(Continued)

ven fabric layer is impregnated with at least a part of the resin in the olefin resin layer, the olefin resin layer is provided with a plurality of micropores. The sheet for an automobile interior/exterior material as a whole has air permeability of 1 to 60 (cm$^3$/cm$^2$·second) in the thickness direction.

17 Claims, 4 Drawing Sheets

(51) Int. Cl.
    *B32B 27/12*           (2006.01)
    *B32B 27/32*           (2006.01)
    *B60R 13/08*           (2006.01)

(58) Field of Classification Search
    USPC ........................................................ 181/290
    See application file for complete search history.

(56) References Cited

U.S. PATENT DOCUMENTS

| | | | | |
|---|---|---|---|---|
| 8,758,875 B2 * | 6/2014 | Yada | ................... | B60R 13/083 428/138 |
| 2006/0124387 A1 * | 6/2006 | Berbner | ................... | F01N 1/24 181/290 |
| 2007/0137926 A1 * | 6/2007 | Albin, Jr. | ............ | B60R 13/0815 181/290 |
| 2009/0011210 A1 * | 1/2009 | Gao | ..................... | B29C 70/504 428/220 |
| 2010/0213002 A1 * | 8/2010 | Oboodi | ..................... | B32B 5/08 181/290 |
| 2011/0139542 A1 * | 6/2011 | Borroni | ............... | B60R 13/0861 181/290 |
| 2016/0059799 A1 * | 3/2016 | Kim | ........................ | B32B 27/32 296/39.3 |
| 2017/0197559 A1 * | 7/2017 | Hattori | ................... | B60R 13/02 |
| 2018/0229466 A1 * | 8/2018 | Hata | .................... | B29C 65/028 |

OTHER PUBLICATIONS

English Abstract for JP2015205688, Publication Date: Nov. 19, 2015.

English Abstract for JP2003225959, Publication Date: Aug. 12, 2003.

English Abstract for JP2000264255, Publication Date: Sep. 26, 2000.

* cited by examiner

SHEET FOR INTERIOR OR EXTERIOR MATERIALS FOR AUTOMOBILES AND METHOD FOR PRODUCING SAME

FIELD OF THE INVENTION

The present invention relates to a sheet for an automobile interior/exterior material having excellent sound-absorbing performance and a method of producing the same.

In this specification and claims, the term "melt flow rate" means a melt flow rate measured at a test temperature of 190° C. and a test load of 21.2 N according to JIS K7210-1999.

In addition, in this specification and claims, the term "air permeability" denotes air permeability measured by the method A of 8.27.1 according to JIS L1096-1999.

BACKGROUND ART

Conventionally, a fender liner molded into a shape compatible with an inner peripheral surface of a wheelhouse of an automobile is attached to a wheelhouse of an automobile. By providing such a fender liner, for example, sounds (road noise) generated from automobile tires while driving can be absorbed and reduced and collision sounds, etc., generated when sand, rocks, and ice scattered due to contact with tires collide with an inner peripheral surface of (the fender liner of) a wheelhouse can be reduced.

As such a fender liner, a fender liner made of a hard fiberboard molded into a shape compatible with the inner surface shape of an automobile fender, etc., is publicly known (see Patent Document 1).

PRIOR ART DOCUMENT

Patent Document

Patent Document 1: Japanese Unexamined Patent Application Publication No. 2000-264255

SUMMARY OF THE INVENTION

Problems to be Solved by the Invention

Conventionally, it was desired to enhance quietness in a cabin space of an automobile, and as an automobile interior material, etc., such as an automobile floor mat, that can absorb sounds in a range of 500 Hz to 1,200 Hz was used, but in recent years, in addition to that, it has been increasingly strongly desired to sufficiently suppress noises generated to outside a vehicle from a driving automobile (aforementioned road noises and collision sounds of rocks and sand, etc.). Specifically, as an automobile exterior material such as the aforementioned fender liner, etc., in addition to being capable of absorbing sounds in the range of 500 Hz to 1200 Hz, it has been strongly desired to be able to sufficiently absorb sounds on the high frequency side (1,200 Hz to 2,000 Hz) of a mid-frequency range. However, a conventional automobile exterior material such as a fender liner, etc., could not sufficiently absorb sounds on the aforementioned high frequency side (1,200 Hz to 2,000 Hz).

Further, in cold climate regions, since snow and frozen ice, etc., on a road are splashed while driving an automobile, there was a problem that an icing phenomenon in which a large amount of snow and ice get fixed on a surface (tire side surface) of a fender liner of a wheelhouse of an automobile is likely to occur. Therefore, when using an automobile exterior material as a fender liner, a material in which such an icing phenomenon is unlikely to occur was desired in view of stable driving.

The present invention has been made in view of the aforementioned technical background, and aims to provide a sheet for an automobile interior/exterior material having an excellent sound-absorbing performance and a method of producing the sheet, and an automobile interior/exterior material (molded body) having excellent sound-absorbing performance and a method of producing the material.

Means for Solving the Problems

In order to attain the aforementioned object, the present invention provides the following means.

[1] A sheet for an automobile interior/exterior material, comprising:

a nonwoven fabric layer in which a fiber weight per unit area is 220 g/m$^2$ to 1,000 g/m$^2$; and an olefin resin layer laminated on one of surfaces of the nonwoven fabric layer, wherein a formation amount of the olefin resin layer is in a range of 100 g/m$^2$ to 500 g/m$^2$, a melt flow rate of the olefin resin layer is in a range of 1 g/10 minutes to 90 g/10 minutes, at least a part of a resin of the olefin resin layer is impregnated in the nonwoven fabric layer, a plurality of micropores is formed in the olefin resin layer, and air permeability of an entirety of the sheet for an automobile interior/exterior material in a thickness direction is in a range of 1 to 60 (cm$^3$/cm$^2$·second).

[2] The sheet for an automobile interior/exterior material as recited in Item [1], wherein the fiber weight per unit area of the nonwoven fabric layer is 300 g/m$^2$ to 1,000 g/m$^2$, the olefin resin layer is a low density polyethylene resin layer, and the air permeability of the entirety of the sheet for an automobile interior/exterior material in the thickness direction is in a range of 1 to 20 (cm$^3$/cm$^2$·second).

[3] The sheet for an automobile interior/exterior material as recited in the aforementioned Item [2], wherein the low density polyethylene resin layer is a linear low density polyethylene resin layer.

[4] The sheet for an automobile interior/exterior material as recited in any one of the aforementioned Items [1] to [3], wherein the melt flow rate of the olefin resin is in a range of 1 g/10 minutes to 40 g/10 minutes.

[5] The sheet for an automobile interior/exterior material as recited in any one of the aforementioned Items [1] to [4], wherein a size of the micropore is in a range of 50 μm to 1,000 μm.

[6] The sheet for an automobile interior/exterior material as recited in any one of the aforementioned Items [1] to [5], wherein a thickness of the fiber constituting the nonwoven fabric layer is 2 decitex to 17 decitex, and the fiber weight per unit area of the nonwoven fabric layer is 500 g/m$^2$ to 800 g/m$^2$.

[7] The sheet for an automobile interior/exterior material as recited in any one of the aforementioned Items [1] to [6], wherein the air permeability of the entirety of the sheet for an automobile interior/exterior material in the thickness direction is in a range of 1 to 5 (cm$^3$/cm$^2$·second).

[8] The sheet for an automobile interior/exterior material as recited in any one of the aforementioned Items [1] to [7], wherein the formation amount of the olefin resin layer is in a range of 150 g/m² to 300 g/m².

[9] An automobile interior/exterior material obtained by forming the sheet for an automobile interior/exterior material as recited in any one of the aforementioned Items [1] to [8].

[10] A method of producing an automobile interior/exterior material, comprising:
thermoforming the sheet for an automobile interior/exterior material as recited in any one of the aforementioned items [1] to [8].

[11] A method of producing a sheet for an automobile interior/exterior material, comprising:
a lamination step for forming a laminated sheet in which an olefin resin layer having a melt flow rate of 1 g/10 minutes to 90 g/10 minutes is laminated on one of surfaces of a nonwoven fabric layer in which a fiber weight per unit area is 220 g/m² to 1,000 g/m² so that a formation amount of the olefin resin layer is 100 g/m² to 500 g/m²; and
a forcibly impregnating step for obtaining a sheet for an automobile interior/exterior material in which air permeability in a thickness direction is 1 to 60 (cm³/cm²·second) by impregnating at least a part of the olefin resin in the nonwoven fabric layer by suctioning a gas in the nonwoven fabric layer from the other surface side of the nonwoven fabric layer in a state in which the olefin resin is softened or melted by heating to form a number of micropores in the olefin resin layer.

[12] A method of producing a sheet for an automobile interior/exterior material, comprising:
a lamination step for forming a laminated sheet in which an olefin resin layer having a melt flow rate of 1 g/10 minutes to 90 g/10 minutes is laminated on one of surfaces of a nonwoven fabric layer in which a fiber weight per unit area is 220 g/m² to 1,000 g/m² so that a formation amount of the olefin resin layer is 100 g/m² to 500 g/m²; and
a forcibly impregnating step for obtaining a sheet for an automobile interior/exterior material in which air permeability in a thickness direction is 1 to 60 (cm³/cm²·second) by impregnating at least a part of the olefin resin in the nonwoven fabric layer by spraying a gas against a surface of the olefin resin layer in a state in which the olefin resin is softened or melted by heating to form a number of micropores in the olefin resin layer.

[13] The method of producing a sheet for an automobile interior/exterior material as recited in the aforementioned Item [11] or [12], wherein
the fiber weight per unit area of the nonwoven fabric layer is 300 g/m² to 1,000 g/m²,
the olefin resin layer is a low density polyethylene resin layer, and
the air permeability of the entirety of the sheet for an automobile interior/exterior material in the thickness direction is in a range of 1 to 20 (cm³/cm²·second).

[14] The method of producing a sheet for an automobile interior/exterior material as recited in the aforementioned Item [13], wherein the low density polyethylene resin layer is a linear low density polyethylene resin layer.

[15] The method of producing a sheet for an automobile interior/exterior material as recited in any one of the aforementioned Items [11] to [14], wherein the melt flow rate of the olefin resin is in a range of 1 g/10 minutes to 40 g/10 minutes.

[16] The method of producing a sheet for an automobile interior/exterior material as recited in any one of the aforementioned Items [11] to [15], wherein the thickness of the fiber constituting the nonwoven fabric layer is 2 decitex to 17 decitex,
the fiber weight per unit area of the nonwoven fabric layer is 500 g/m² to 800 g/m², and
a size of the micropore is in a range of 50 μm to 1,000 μm.

[17] A method of producing an automobile interior/exterior material, comprising:
thermoforming the sheet for an automobile interior/exterior material produced by the method as recited in any one of the aforementioned Items [11] to [16].

Effects of the Invention

According to the invention of the aforementioned Item [1], it is possible to provide a sheet for an automobile interior/exterior material capable of sufficiently absorbing sounds in the range of 500 Hz to 1,200 Hz as well as sounds in the range of 1,200 Hz to 2,000 Hz which is slightly higher than the aforementioned range and also capable of obtaining excellent sound-absorbing performance. For example, in the case of using as an automobile exterior material such as a fender liner, it is possible to sufficiently absorb noise (road noise and collision sounds, etc., of rocks and sand, etc.) generated by driving an automobile. Further, a low density polyethylene resin layer having high water repellency is formed on the surface (exposed to the surface) so that the formation amount is 100 g/m² to 500 g/m² and a plurality of micropores is formed in the surface resin layer, in the case of using an automobile exterior material such as a fender liner or the like, effects that snow and ice are less likely to adhere to the automobile exterior material and the anti-icing performance is excellent can be obtained.

According to the invention of the aforementioned Item [2], the fiber weight per unit area of the nonwoven fabric layer is 300 g/m² to 1,000 g/m², the olefin resin layer is a low density polyethylene resin layer, and the air permeability of the entirety of the sheet for an automobile interior/exterior material in the thickness direction is in a range of 1 to 20 (cm³/cm²·second). Therefore, the sound-absorbing performance between 1,000 Hz to 1,250 Hz can be further improved.

According to the invention of the aforementioned Item [3], since a linear low density polyethylene resin is used as the aforementioned low density polyethylene resin, there are advantages that it is comparatively low in melt tension and easy in impregnation of the nonwoven fabric.

According to the invention of the aforementioned Item [4], since the melt flow rate of the olefin resin is in the range of 1 g/10 minutes to 40 g/10 minutes, the formation (lamination) of the olefin resin layer on the nonwoven fabric layer can be made easier.

According to the invention of the aforementioned Item [5], since the size of the micropore is in the range of 50 μm to 1,000 μm, snow and ice are even less likely to get fixed, which can further improve the anti-icing performance.

According to the invention of the aforementioned Item [6], since the thickness of the fiber constituting the nonwoven fabric layer is 2 decitex to 17 decitex and the fiber weight per unit area of the nonwoven fabric layer is 500 g/m² to 800 g/m², the moldability of the sheet can be improved and the rigidity of the automobile interior/exterior material can also be improved.

According to the invention of the aforementioned Item [7], since the air permeability of the entirety of the sheet for an automobile interior/exterior material in the thickness direction is in the range of 1 to 5 (cm³/cm²·second), sounds of 1,200 Hz to 2,000 Hz which are on a slightly higher frequency side can be more sufficiently absorbed.

According to the invention of the aforementioned Item [8], since the formation amount of the olefin resin layer is in the range of 150 g/m² to 300 g/m², impact resistance and damage resistance can be sufficiently secured.

According to the invention of the aforementioned Items [9] and [10], it is possible to provide an automobile interior/exterior material (shaped body of the sheet for an automobile interior/exterior material) capable of sufficiently absorbing sounds in the range of 500 Hz to 1,200 Hz as well as sounds in the range of 1,200 Hz to 2,000 Hz which is slightly higher than the aforementioned range and having excellent sound-absorbing performance. Further, the automobile exterior material can obtain the effect that snow and ice are less likely to adhere to the automobile exterior material and the anti-icing performance is excellent can be obtained.

According to the invention of the aforementioned Items [11] and [12], a laminated sheet in which an olefin resin layer having a melt flow rate of 1 g/10 minutes to 90 g/10 minutes is laminated on one of surfaces of a nonwoven fabric layer in which a fiber weight per unit area is 220 g/m² to 1,000 g/m² is formed so that a formation amount of the olefin resin layer is 100 g/m² to 500 g/m² and thereafter, the nonwoven fabric layer is impregnated with at least a part of the olefin resin by "suctioning a gas in the nonwoven fabric layer from the other surface side of the nonwoven fabric layer" or "impregnating at least a part of the olefin resin in the nonwoven fabric layer by spraying a gas against a surface of the olefin resin layer" in a state in which the olefin resin is softened or melted by heating to forma number of micropores in the olefin resin layer. Therefore, it is possible to produce a sheet for an automobile interior/exterior material capable of sufficiently absorbing sounds in the range of 500 Hz to 1,200 Hz, as well as absorbing sounds of 1,200 Hz to 2,000 Hz which is a range slightly higher than the aforementioned range and capable of obtaining excellent sound-absorbing performance. Further, an effect that the obtained sheet for an automobile interior/exterior material which is less likely to adhere snow and ice and excellent in anti-icing performance can be obtained. In the inventions of Items [11] and [12], the lamination step and the forcibly impregnating step can be continuously performed by a line production system or the like, or can be performed non-continuously. The inventions of Items [11] and [12] cover both of these embodiments.

According to the invention of the aforementioned Item [13], since the fiber weight per unit area of the nonwoven fabric layer is 300 g/m² to 1,000 g/m², the olefin resin layer is a low density polyethylene resin layer, and the air permeability of the entirety of the sheet for an automobile interior/exterior material in the thickness direction is in the range of 1 to 20 (cm³/cm²·second), a sheet for an automobile interior/exterior material in which the sound-absorbing performance of 1,000 Hz to 1,250 Hz is further improved can be produced.

In the invention of the aforementioned Item [14], since a linear low density polyethylene resin is used as the aforementioned low density polyethylene resin, there is an advantage that it has comparatively low melt tension and can easily be impregnated into the nonwoven fabric.

According to the invention of the aforementioned Item [15], since the melt flow rate of the olefin resin is in the range of 1 g/10 minutes to 40 g/10 minutes, the formation (lamination) of the olefin resin layer on the nonwoven fabric layer can be made easier.

According to the invention of Item [16], since the thickness of the fiber constituting the nonwoven fabric layer is 2 decitex to 17 decitex, the fiber weight per unit area of the nonwoven fabric layer is 500 g/m² to 800 g/m², and the size of the micropore is in the range of 50 μm to 1000 μm, the formability of the sheet can be improved and the rigidity of the automobile interior/exterior material can also be improved. Further, the obtained automobile interior/exterior material is much less likely to be adhered by snow and ice, which can further improve the anti-icing performance.

According to the invention of the aforementioned Item [17], it is possible to provide an automobile interior/exterior material (shaped body of a sheet for an automobile interior/exterior material) capable of sufficiently absorbing sounds in the range of 500 Hz to 1,200 Hz as well as sounds in a range of 1200 Hz to 2,000 Hz which is slightly higher than the aforementioned range and also capable of obtaining excellent sound-absorbing performance. Further, an effect can also be obtained in which the obtained automobile interior/exterior material (shaped body) is less likely to be adhered by snow and ice and therefor it is excellent in anti-icing performance.

EMBODIMENT FOR CARRYING OUT THE INVENTION

A method of producing a sheet for an automobile interior/exterior material according to the present invention will be described.

First, a laminated sheet 4 in which an olefin resin layer 3 having a melt flow rate (MFR) of 1 g/10 minutes to 90 g/10 minutes is laminated on one of surfaces of a nonwoven fabric layer 2 in which the fiber weight per unit area is 220 g/m² to 1,000 g/m² is laminated so that a formation amount of the olefin resin layer is 100 g/m² to 500 g/m² (lamination step).

Figure 1:
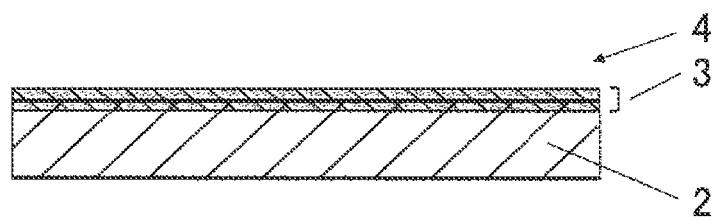
FIG. 1 is a schematic cross-sectional diagram showing a laminated sheet obtained by laminating a molten olefin resin film (extruded resin layer) and a nonwoven fabric (layer) and pressing them between a pair of rolls.

For example, the laminated sheet 4 as shown in FIG. 1 is obtained by pressing a nonwoven fabric (layer) 2 in which the fiber weight per unit area is 220 g/m² to 1,000 g/m² and an olefin resin film (layer) 3 in which a MFR immediately after being extruded from an extruder is 1 g/10 minutes to 90 g/10 minutes between a pair of rolls.

Figure 2:
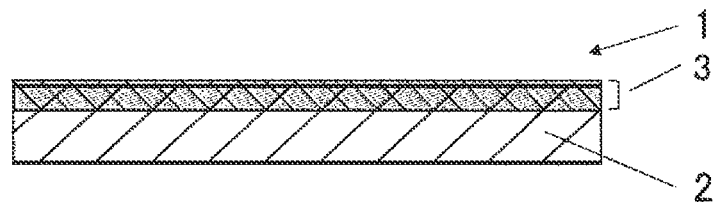
FIG. 2 is a schematic cross-sectional diagram showing one embodiment of a sheet for an automobile interior/exterior material according to the present invention.

Next, in a state in which the aforementioned olefin resin layer is softened or melted by heating, at least a part of the olefin resin is impregnated into the nonwoven fabric layer 2 by suctioning a gas (typically air) in the nonwoven fabric layer from the other surface side of the nonwoven fabric layer 2 to form a plurality of micropores in the olefin resin layer 3 to obtain a sheet 1 for an automobile interior/exterior material shown in FIG. 2 (forcibly impregnating step). With such a production method, a sheet 1 for an automobile interior/exterior material in which the air permeability in the thickness direction is in a range of 1 to 60 (cm$^3$/cm$^2$·second) can be obtained.

The heating device for the aforementioned heating is not especially limited, but for example, a far infrared heater, gas heater, etc., can be exemplified. It is preferable to perform the heating in a manner such that the surface temperature of the olefin resin layer becomes a temperature equal to or higher than the melting point of the olefin resin. In cases where a linear low density polyethylene resin (LLDPE) is used as the olefin resin, it is especially preferable to perform the heating so that the surface temperature of the resin layer becomes 150° C. to 190° C.

Figure 3:
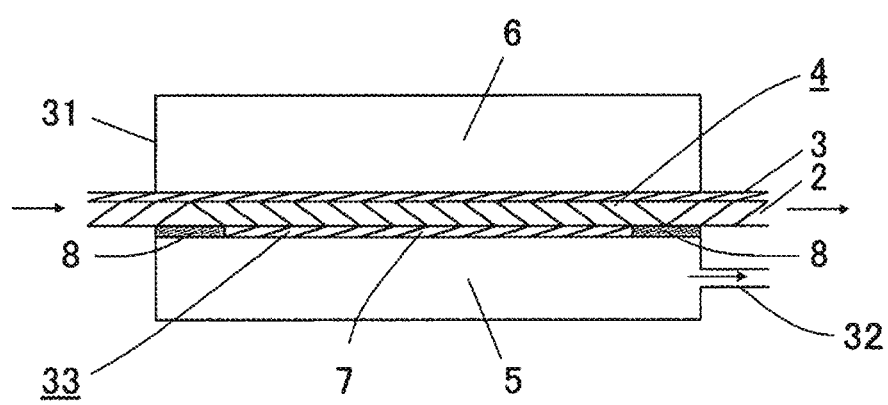
FIG. 3 is a schematic diagram showing one example of a forcibly impregnating step using a suction method of the production method according to the present invention.

In the aforementioned forcibly impregnating step, it is preferable to perform forcible impregnation of the resin using a suction treatment tank 31 as shown in FIG. 3. In the suction treatment tank 31, an air permeable suction nozzle 33 is mounted in an approximately horizontal state inside the tank (see FIG. 3). The aforementioned air permeable suction nozzle 33 is equipped with an air permeable reticular plate portion 7 made of a wire mesh or the like and a non-air permeable peripheral plate portion 8 provided on the periphery of the reticular plate portion 7 (see FIG. 3). The inner space of the suction treatment tank 31 is partitioned into a lower space 5 and an upper space 6 in an air permeable manner by the air permeable suction nozzle 33. To the suction treatment tank 31, an exhaust tube (suction tube) 32 communicated with the lower space 5 is attached. A suction device (not illustrated) is connected to the exhaust tube 32, so that the air inside the lower space 5 can be suctioned via the exhaust tube 32 by operating the suction device. When performing forcible impregnation, a laminated sheet 4 (in a state in which the olefin resin is in a softened or melted state) is arranged on the upper surface of the air permeable suction nozzle 33 or passed on the upper surface of the air permeable suction nozzle 33. At this time, as shown in FIG. 3, the sheet is placed with the nonwoven fabric layer 2 positioned on the lower side (the nonwoven fabric layer 2 is positioned on the air permeable suction nozzle 33 side).

An example for performing the resin forcible impregnation using the suction treatment tank 31 will be explained. First, by passing or disposing the obtained laminated sheet 4 below the heating device to soften or melt the olefin resin, then the air inside the lower space 5 is suctioned while the laminated sheet 4 is quickly passed over the upper surface of the air permeable suction nozzle 33 in the suction treatment tank 31. With this, the air in the nonwoven fabric layer 2 is suctioned from the other surface side (lower surface side) of the nonwoven fabric layer 2. As a result, at least a part of the olefin resin is further impregnated into the nonwoven fabric layer 2 and at this time, a plurality of micropores is formed in the olefin resin layer 3. Thus, a sheet 1 for an automobile interior/exterior material as shown in FIG. 2 can be obtained.

As the suction condition when performing the suction, the suction is preferably performed under the condition of having a suction force of "−2 kPa to −20 kPa", more preferably performed under a suction force of "−3 kPa to −15 kPa", especially preferably performed under a suction force of "−5 kPa to −10 kPa". Further, it is preferable to perform the suction under the condition of the suction rate of 1 m/min to 20 m/min.

The forcibly impregnating step may be performed in the following manner. That is, in a state in which the olefin resin layer is softened or melted by heating, a gas (typically air) is sprayed toward the surface of the olefin resin layer to impregnate at least a part of the olefin resin into the nonwoven fabric layer and form a plurality of micropores in the olefin resin layer to thereby obtain a sheet 1 for an automobile interior/exterior material as shown in FIG. 2 (forcibly impregnating step). By spraying a gas (typically air) as mentioned above, a sheet 1 for an automobile interior/exterior material having a similar structure obtained by the aforementioned suction method can be obtained.

It is preferable that the spraying pressure for the aforementioned spraying is set to a range of 100 kPa to 600 kPa. The device for spraying air is not especially limited, but for example, a slit type air nozzle, etc., can be exemplified.

Note that, in the aforementioned production method, the heating device and the suction treatment tank 31 may be arranged separately, alternatively the heating device may be attached to the inner surface of the upper wall of the suction treatment tank 31. That is, it may be any device configuration as long as it is a device configuration capable of performing the suction or the spraying in a state in which the olefin resin is softened or melted.

Further, in the production method, the lamination step and the forcibly impregnating step may be continuously performed or may be non-continuously performed. That is, for example, as an example of the former continuous method, after continuously performing the forcibly impregnating step after the lamination step by a line method, etc., the sheet 1 for an automobile interior/exterior material may be produced by cutting it into a prescribed size, or as an example of the latter non-continuous method, after cutting the laminated sheet 4 into a prescribed size after the lamination step, the forcibly impregnating step may be performed on each of the cut product.

The sheet 1 for an automobile interior/exterior material obtained by the aforementioned production method according to the present invention has the following configuration. That is, the sheet 1 for an automobile interior/exterior material is equipped with a nonwoven fabric layer 2 having a fiber weight per unit area of 220 g/m$^2$ to 1,000 g/m$^2$ and an olefin resin layer 3 laminated on one of surfaces of the nonwoven fabric layer 2. The formation amount of the olefin resin layer 3 is in a range of 100 g/m$^2$ to 500 g/m$^2$. The melt flow rate (MFR) of the olefin resin is in a range of 1 g/10 minutes to 90 g/10 minutes. At least a part of the resin of the olefin resin layer 3 is impregnated into the nonwoven fabric layer 2. A plurality of micropores is provided in the olefin resin layer 3 (see FIG. 4). The air permeability of the entirety of the sheet for an automobile interior/exterior material in the thickness direction is in a range of 1 to 60 (cm$^3$/cm$^2$·second) (see FIG. 2).

Figure 4:
FIG. 4 is a scanning electron micrograph (SEM photo) of a sheet for an automobile interior/exterior material in plan view.
Figure 5:
FIG. 5 is a scanning electron micrograph (SEM photo) of a cross-section of a sheet for an automobile interior/exterior material.

The scanning electron micrograph of the obtained sheet 1 for an automobile interior/exterior material in plan view is shown in FIG. 4. It is confirmed that a plurality of micropores is formed in the olefin resin layer 3. Further, the scanning electron micrograph of the cross-section of the obtained sheet 1 for an automobile interior/exterior material is shown in FIG. 5. It can be understood from FIG. 5 that, with the forcibly impregnating step, the obtained sheet 1 for an automobile interior/exterior material has a structure in which the impregnation of the olefin resin layer progresses (spreads) further inside the nonwoven fabric layer 2 and a part of the olefin resin thinly covers the surface of the nonwoven fabric layer 2 (with a slight thickness). Since it has a structure in which the surface of the nonwoven fabric layer 2 is thinly covered by a part of the olefin resin (with a slight thickness), the surface of the obtained sheet 1 for an automobile interior/exterior material (surface on the covered side; resin surface; upper surface in FIG. 2) is a fine uneven surface reflecting the fine unevenness of the surface (having a rough feel) formed by the constituent fibers of the nonwoven fabric layer 2. Note that the surface of the laminated sheet 4 (surface of the olefin resin layer 3) in the middle of the production is a flat surface with no rough feeling.

The sheet 1 for an automobile interior/exterior material can sufficiently absorb sounds in the range of 500 Hz to 1,200 Hz, as well as sounds of 1,200 Hz to 2,000 Hz which is a range slightly higher than the aforementioned range, and excellent sound-absorbing performance may be obtained. For example, in the case of using an automobile exterior material such as a fender liner, noise generated by driving an automobile (road noise and collision sounds of, e.g., rocks and sand, etc.) may be sufficiently absorbed. Further, an olefin resin layer having high water repellency is provided on the surface (exposed to the surface) so that a formation amount is 100 g/m$^2$ to 500 g/m$^2$, a plurality of micropores is provided in the surface resin layer, and the surface is a fine uneven surface having a rough feeling as described above. Therefore, in the case of using as an automobile exterior material such as a fender liner, an effect that snow and ice are not likely to be adhered to the automobile exterior material and it is excellent in anti-icing performance.

In the present invention, the fiber weight per unit area of the nonwoven fabric layer 2 is set to 220 g/m$^2$ to 1,000 g/m$^2$. When it is less than 220 g/m$^2$, sufficient sound-absorbing performance cannot be obtained, and when it exceeds 1,000 g/m$^2$, there is a problem of cost increase and weight increase. Among other things, it is preferable that the fiber weight per unit area of the nonwoven fabric layer 2 be set to 250 g/m$^2$ to 800 g/m$^2$. Further, in the case of using as an automobile floor mat, it is especially preferable that the fiber weight per unit area of the nonwoven fabric layer 2 be set to 250 g/m$^2$ to 350 g/m$^2$. Furthermore, in the case of using as an automobile fender liner, it is preferable that the fiber weight per unit area of the nonwoven fabric layer 2 be set to 700 g/m$^2$ to 800 g/m$^2$. For the automobile floor mat, lightness is desired and emphasized in comparison to the automobile fender liner, and in the case of using as an automobile floor mat, a smaller fiber weight per unit area of the nonwoven fabric layer 2 is better.

It is preferable that the thickness of the fiber constituting the nonwoven fabric layer 2 be 2 decitex to 17 decitex. When it is 2 decitex or more, the strength of the sheet can be secured, and when it is 17 decitex or less, the sound-absorbing performance can be improved. Among other things, it is preferable that the thickness of the fiber constituting the nonwoven fabric layer 2 be 6 decitex to 15 decitex. The thicker the thickness of the fiber constituting the nonwoven fabric layer 2, the thickness of the nonwoven fabric layer 2 can be made thicker, which can further improve the sound-absorption performance.

As the olefin resin, an olefin resin in which the melt flow rate (MFR) is in a range of 1 g/10 minutes to 90 g/10 minutes is used. When the MFR is smaller than the lower limit value, the resin impregnation cannot be performed sufficiently and almost no micropore is formed. On the other hand, when the MFR is larger than the upper limit value, the olefin resin is excessively impregnated into the nonwoven fabric layer, resulting in excessive air permeability. As a result, excellent sound-absorbing performance cannot be obtained. Among other things, it is preferable that the melt flow rate of the olefin resin be in a range of 10 g/10 minutes to 50 g/10 minutes, particularly in a range of 20 g/10 minutes to 30 g/10 minutes.

Also, the formation amount of the olefin resin layer 3 is set in a range of 100 g/m$^2$ to 500 g/m$^2$. If it is less than 100 g/m$^2$, there is a problem of causing insufficient strength, and if it exceeds 500 g/m$^2$, it becomes difficult to form micropores (only a small number of micropores are formed), causing a problem that excellent sound-absorbing performance cannot be obtained. Among other things, it is preferable that the formation amount of the olefin resin layer 3 be in a range of 150 g/m$^2$ to 300 g/m$^2$, especially preferable in a range of 150 g/m$^2$ to 250 g/m$^2$.

The olefin resin constituting the olefin resin layer 3 is not especially limited, but for example, a polyethylene resin, a polypropylene resin, etc., can be exemplified. The polyethylene resin is not especially limited, but for example, a linear low density polyethylene resin (LLDPE), a low density polyethylene resin (LDPE), a high density polyethylene resin (HDPE), etc., can be exemplified. As the polypropylene resin, it is not especially limited, but for example, a random polypropylene (random PP), a homopropylene (homo PP; propylene homopolymer), etc., can be exemplified. As the random polypropylene, a random copolymer, etc., containing an olefin component such as ethylene, etc., (except for propylene) and propylene can be exemplified.

Comparing when the air permeability is the same or almost the same level in the air permeability range of 1 to 60 (cm$^3$/cm$^2$·second), as the olefin resin constituting the olefin resin layer 3, among the following, in order to further improve the bending strength, the shearing force, and the durability test evaluation, it is preferable to use a resin listed earlier in the following order:

Homo PP>random PP>HDPE>LDPE>LLDPE.

That is, a homo PP is most preferably used as the olefin resin constituting the olefin resin layer 3.

It is preferable that the size (diameter) of the micropore formed in the olefin resin layer 3 be in a range of 50 µm to 1,000 µm. When it is 50 µm or more, excellent sound-absorption performance can be secured, and when it is 1,000 µm or less, sufficient anti-icing performance can be secured. Among other things, it is more preferable that the size (diameter) of the micropore be 70 µm to 300 µm, especially a range of 100 µm to 200 µm.

Furthermore, it is necessary that the air permeability of the entirety of the sheet 1 for an automobile interior/exterior material in the thickness direction be in a range of 1 to 60 (cm$^3$/cm$^2$·second). When the air permeability deviates from the range of 1 to 60 (cm$^3$/cm$^2$·second) (when smaller than the lower limit value or larger than the upper limit value), sufficient sound-absorbing performance cannot be obtained. In addition, in a structure in which the air permeability exceeds 60 (cm$^3$/cm$^2$·second), the bending strength, the shearing force, and the durability test evaluation become worse. Among other things, it is preferable that the air permeability of the entirety of the sheet 1 for an automobile interior/exterior material in the thickness direction be in a range of 5 to 50 (cm$^3$/cm$^2$·second), especially a range of 10 to 30 (cm$^3$/cm$^2$·second).

It is preferable that the thickness of the sheet 1 for an automobile interior/exterior material be in a range of 1 mm to 10 mm.

Figure 6:
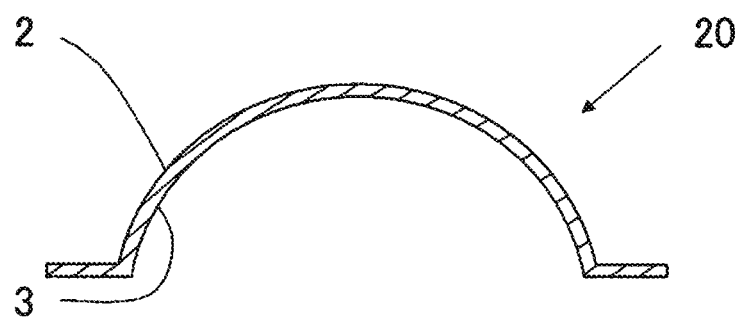
FIG. 6 is a cross-sectional view showing one embodiment of an automobile interior/exterior material (shaped body).

An automobile interior/exterior material 20 (see FIG. 6) can be obtained by subjecting the sheet 1 for an automobile interior/exterior material to thermoforming into a predetermined shape. The thermoforming method is not particularly limited, and examples thereof include heat press molding and the like. In the case of using the automobile interior/exterior material as an automobile fender liner, when the automobile fender liner is installed on the inner peripheral surface of the wheelhouse, etc., it is installed such that the olefin resin layer 3 side (upper surface side of FIG. 2) is disposed on the tire side and the nonwoven fabric layer 2 side (lower surface side of FIG. 2) is disposed on the wheelhouse side.

The sheet 1 for an automobile interior/exterior material according to the present invention can exert advantageous effects as described below by having the following configuration (A), (B), or (C). Therefore, for example, the configuration (A), (B), or (C) is desirable.

(A) A sheet for an automobile interior/exterior material comprising a nonwoven fabric layer having a fiber weight per unit area of 220 g/m$^2$ to 1,000 g/m$^2$ and a low density polyethylene resin layer laminated on one of surfaces of the nonwoven fabric layer, wherein a formation amount of the low density polyethylene resin layer is in a range of 100 g/m$^2$ to 500 g/m$^2$, the melt flow rate of the low density polyethylene resin layer is in a range of 1 g/10 minutes to 90 g/10 minutes, at least a part of the low density polyethylene resin layer resin is impregnated into the nonwoven fabric layer, a plurality of micropores is provided in the low density polyethylene resin layer, and the air permeability of the entirety of the sheet for an automobile interior/exterior material in the thickness direction is in a range of 1 to 20 (cm$^3$/cm$^2$·second).

In the case of adopting the configuration (A), a sheet for an automobile interior/exterior material capable of absorbing sounds of 1,000 Hz more efficiently can be obtained.

(B) A sheet for an automobile interior/exterior material comprising a nonwoven fabric layer having a fiber weight per unit area of 300 g/m$^2$ to 1,000 g/m$^2$ and an polypropylene resin layer laminated on one of surfaces of the nonwoven fabric layer, wherein a formation amount of the polypropylene resin layer is in a range of 100 g/m$^2$ to 200 g/m$^2$, the melt flow rate of the polypropylene resin layer is in a range of 20 g/10 minutes to 30 g/10 minutes, at least a part of the polypropylene resin layer resin is impregnated into the nonwoven fabric layer, a plurality of micropores is provided in the polypropylene resin layer, and the air permeability of the entirety of the sheet for an automobile interior/exterior material in the thickness direction is in a range of 20 to 60 (cm$^3$/cm$^2$·second).

In the case of adopting the configuration (B), a sheet for an automobile interior/exterior material even more capable of absorbing sounds of higher frequency (5,000 Hz to 6,300 Hz) can be obtained.

(C) A sheet for an automobile interior/exterior material comprising a nonwoven fabric layer having a fiber weight per unit area of 250 g/m$^2$ to 350 g/m$^2$ and an polyethylene resin layer laminated on one of surfaces of the nonwoven fabric layer, wherein a formation amount of the polyethylene resin layer is in a range of 150 g/m$^2$ to 300 g/m$^2$, the melt flow rate of the polypropylene resin layer is in a range of 5 g/10 minutes to 20 g/10 minutes, at least a part of the polyethylene resin layer resin is impregnated into the nonwoven fabric layer, a plurality of micropores is provided in the polyethylene resin layer, and the air permeability of the entirety of the sheet for an automobile interior/exterior material in the thickness direction is in a range of 1 to 10 (cm$^3$/cm$^2$·second).

In the case of adopting the configuration (C), a sheet for an automobile interior/exterior material capable of further improving 2,000 Hz sound-absorbing performance can be obtained.

EXAMPLES

Next, specific examples of the present invention will be described, but the present invention is not particularly limited to those of these examples.

Example 1

A laminated sheet 4 (see FIG. 1) in which a low density polyethylene resin layer 3 (olefin resin layer) was laminated on one of surfaces of the nonwoven fabric layer 2 was obtained by pressing a nonwoven fabric (layer) having a fiber weight per unit area of 800 g/m$^2$ formed by PET fibers (polyethylene terephthalate fiber) of 6 decitex and a linear low density polyethylene resin film (LLDPE; melting point of 125° C., melt flow rate of 20 g/10 minutes, 200 g/m$^2$) immediately after being extruded from an extruder (extruding temperature: 200° C.) between a pair of rolls (lamination step).

Next, in a state in which a linear low density polyethylene resin was melted by heating a surface of the laminated sheet 4 on the linear low density polyethylene resin layer 3 side using a far infrared heater so that the surface temperature of the resin layer 3 became 150° C., while passing the laminated sheet 4 over the upper surface of the air permeable suction nozzle 33 in the suction treatment tank 31 at a speed of 2 m/minute, the air in the lower space 5 was suctioned with a suction force of "−5 kPa" using a suction device, the air inside the nonwoven fabric layer was suctioned from the other surface side of the nonwoven fabric layer 2 (see FIG. 3), so that a part of the linear low density polyethylene resin was impregnated into the nonwoven fabric layer 2 to form a plurality of micropores in the linear low density polyethylene resin layer 3. Thus, an automobile fender liner sheet 1 was obtained. The size (diameter) of the micropore was in a range of 100 μm to 150 μm.

Example 2

Except that a linear low density polyethylene resin (LLDPE) having a melt flow rate of 30 g/10 minutes was used in place of a linear low density polyethylene resin (LLDPE) having a melt flow rate of 20 g/10 minutes, an automobile fender liner sheet 1 was obtained in the same manner as in Example 1.

Example 3

Except that a linear low density polyethylene resin (LLDPE) having a melt flow rate of 40 g/10 minutes was used in place of a linear low density polyethylene resin (LLDPE) having a melt flow rate of 20 g/10 minutes, an automobile fender liner sheet 1 was obtained in the same manner as in Example 1.

Example 4

Except that a linear low density polyethylene resin (LLDPE) having a melt flow rate of 70 g/10 minutes was used in place of a linear low density polyethylene resin (LLDPE) having a melt flow rate of 20 g/10 minutes, an automobile fender liner sheet 1 was obtained in the same manner as in Example 1.

Example 5

Except that the formation amount of the LLDPE film was set to 300 g/m$^2$, an automobile fender liner sheet 1 was obtained in the same manner as in Example 1.

Example 6

Except that the formation amount of the LLDPE film was set to 400 g/m$^2$, an automobile fender liner sheet 1 was obtained in the same manner as in Example 1.

Example 7

Except that the fiber weight per unit area of the nonwoven fabric (layer) was set (changed) to 600 g/m$^2$, an automobile fender liner sheet 1 was obtained in the same manner as in Example 1.

Example 8

Except that the fiber weight per unit area of the nonwoven fabric (layer) was set (changed) to 400 g/m$^2$, an automobile fender liner sheet 1 was obtained in the same manner as in Example 1.

Example 9

Except that a linear low density polyethylene resin (LDPE) having a melt flow rate of 20 g/10 minutes was used in place of a linear low density polyethylene resin (LLDPE) having a melt flow rate of 20 g/10 minutes, an automobile fender liner sheet 1 was obtained in the same manner as in Example 1.

Example 10

Except that a nonwoven fabric formed with PET fibers (polyethylene terephthalate fiber) of 3 decitex having a fiber weight per unit area of 800 g/m$^2$ was used in place of a nonwoven fabric formed of PET fibers of 6 decitex having a fiber weight per unit area of 800 g/m$^2$, an automobile fender liner sheet 1 was obtained in the same manner as in Example 1.

Example 11

Except that a nonwoven fabric having a fiber weight per unit area of 800 g/m$^2$ formed with 20 mass % of PET fibers (polyethylene terephthalate fibers) of 15 decitex, 20 mass % of PET fibers of 6 decitex, 50 mass % of heat fusible fibers (binder fibers) of 6 decitex, and 10 mass % of polypropylene fibers of 6 decitex was used in place of a nonwoven fabric formed of PET fibers (polyethylene terephthalate fibers) of 6 decitex having a fiber weight per unit area of 800 g/m$^2$, an automobile fender liner sheet 1 was obtained in the same manner as in Example 1.

Example 12

Next, a laminated sheet 4 was obtained in the same manner as in Example 1 (lamination step). Next, in a state in which a surface of the laminated sheet 4 on the linear low density polyethylene resin layer 3 side was heated using a far infrared heater so that the surface temperature of the resin layer 3 became 150° C. to melt the linear low density polyethylene resin, by spraying air for 2 minutes at an air pressure of 200 kPa against the surface of a linear low density polyethylene resin layer 3 using a slit type air nozzle device, a part of the linear low density polyethylene resin was impregnated into the nonwoven fabric layer 2 to form a plurality of micropores in the linear low density polyethylene resin layer 3 to obtain the automobile fender liner sheet 1. The size (diameter) of the micropore formed in the olefin resin layer 3 was in a range of 200 μm to 300 μm.

Example 13

Except that a linear low density polyethylene resin (LLDPE) having a melt flow rate of 5 g/10 minutes was used in place of a linear low density polyethylene resin (LLDPE) having a melt flow rate of 20 g/10 minutes, an automobile fender liner sheet 1 was obtained in the same manner as in Example 1.

Example 14

Except that a low density polyethylene resin (LDPE) having a melt flow rate of 20 g/10 minutes was used in place of a linear low density polyethylene resin (LLDPE) having a melt flow rate of 20 g/10 minutes and that a nonwoven fabric (layer) having a fiber weight per unit area of 230 g/m$^2$ was used in place of a nonwoven fabric (layer) having a fiber weight per unit area of 800 g/m$^2$, an automobile floor mat sheet (sheet for an automobile interior/exterior material) 1 was obtained in the same manner as in Example 1. The size (diameter) of the micropore was in a range of 350 μm to 500 μm.

Example 15

Except that a nonwoven fabric (layer) having a fiber weight per unit area of 270 g/m$^2$ was used in place of a nonwoven fabric (layer) having a fiber weight per unit area of 230 g/m$^2$, an automobile floor mat sheet (sheet for an automobile interior/exterior material) 1 was obtained in the same manner as in Example 14. The size (diameter) of the micropore was in a range of 300 μm to 500 μm.

Example 16

Except that a high density polyethylene resin (HDPE) having a melt flow rate of 20 g/10 minutes was used in place of a linear low density polyethylene resin (LLDPE) having a melt flow rate of 20 g/10 minutes, an automobile fender liner sheet (sheet for an automobile interior/exterior material) 1 was obtained in the same manner as in Example 1. The size (diameter) of the micropore was in a range of 50 μm to 150 μm.

Example 17

Except that a random polypropylene (random PP) having a melt flow rate of 20 g/10 minutes was used in place of a linear low density polyethylene resin (LLDPE) having a melt flow rate of 20 g/10 minutes, an automobile fender liner sheet (sheet for an automobile interior/exterior material) 1 was obtained in the same manner as in Example 1. The size (diameter) of the micropore was in a range of 50 μm to 150 μm.

Example 18

Except that a homo polypropylene (homo PP) having a melt flow rate of 20 g/10 minutes was used in place of a linear low density polyethylene resin (LLDPE) having a melt flow rate of 20 g/10 minutes and the formation amount of the olefin resin layer 3 was changed to 170 g/m$^2$, a sheet 1 for an automobile interior/exterior material was obtained in the same manner as in Example 1. The size (diameter) of the micropore was in a range of 300 μm to 600 μm.

Example 19

Except that a homo polypropylene (homo PP) having a melt flow rate of 20 g/10 minutes was used in place of a linear low density polyethylene resin (LLDPE) having a melt flow rate of 20 g/10 minutes and the formation amount of the olefin resin layer 3 was changed to 150 g/m², a sheet 1 for an automobile interior/exterior material was obtained in the same manner as in Example 1. The size (diameter) of the micropore was in a range of 300 μm to 650 μm.

Example 20

Except that a homo polypropylene (homo PP) having a melt flow rate of 20 g/10 minutes was used in place of a linear low density polyethylene resin (LLDPE) having a melt flow rate of 20 g/10 minutes and the formation amount of the olefin resin layer 3 was changed to 130 g/m², a sheet 1 for an automobile interior/exterior material was obtained in the same manner as in Example 1. The size (diameter) of the micropore was in a range of 300 μm to 700 μm.

Example 21

Except that a homo polypropylene (homo PP) having a melt flow rate of 20 g/10 minutes was used in place of a linear low density polyethylene resin (LLDPE) having a melt flow rate of 20 g/10 minutes and the formation amount of the olefin resin layer 3 was changed to 130 g/m², a sheet 1 for an automobile interior/exterior material was obtained in the same manner as in Example 1. The size (diameter) of the micropore was in a range of 300 μm to 750 μm.

Example 22

Except that a homo polypropylene (homo PP) having a melt flow rate of 30 g/10 minutes was used in place of a linear low density polyethylene resin (LLDPE) having a melt flow rate of 20 g/10 minutes and the formation amount of the olefin resin layer 3 was changed to 170 g/m², a sheet 1 for an automobile interior/exterior material was obtained in the same manner as in Example 1. The size (diameter) of the micropore was in a range of 300 μm to 750 μm.

Example 23

Except that a homo propylene (homo PP) having a melt flow rate of 20 g/10 minutes was used in place of a linear low density polyethylene resin (LLDPE) having a melt flow rate of 20 g/10 minutes, the formation amount of the olefin resin layer 3 was changed to 170 g/m² and that a nonwoven fabric (layer) having a fiber weight per unit area of 450 g/m² was used in place of a nonwoven fabric (layer) having a fiber weight per unit area of 800 g/m², a sheet for an automobile interior/exterior material) 1 was obtained in the same manner as in Example 1. The size (diameter) of the micropore was in a range of 300 μm to 700 μm.

Example 24

Except that a homo polypropylene (homo PP) having a melt flow rate of 20 g/10 minutes was used in place of a linear low density polyethylene resin (LLDPE) having a melt flow rate of 20 g/10 minutes, a sheet 1 for an automobile interior/exterior material was obtained in the same manner as in Example 12. The size (diameter) of the micropore was in a range of 300 μm to 650 μm.

Comparative Example 1

Except that a linear low density polyethylene resin (LLDPE) having a melt flow rate of 0.5 g/10 minutes was used in place of a linear low density polyethylene resin (LLDPE) having a melt flow rate of 20 g/10 minutes, an automobile fender liner sheet was obtained in the same manner as in Example 1.

Comparative Example 2

Except that a linear low density polyethylene resin (LLDPE) having a melt flow rate of 110 g/10 minutes was used in place of a linear low density polyethylene resin (LLDPE) having a melt flow rate of 20 g/10 minutes, an automobile fender liner sheet was obtained in the same manner as in Example 1.

Comparative Example 3

Except that the formation amount of the LLDPE film was set to 50 g/m², an automobile fender liner sheet was obtained in the same manner as in Example 1.

Comparative Example 4

Except that the formation amount of the LLDPE film was set to 600 g/m², an automobile fender liner sheet was obtained in the same manner as in Example 1.

Comparative Example 5

Except that the fiber weight per unit area of the nonwoven fabric (layer) was set (changed) to 200 g/m², an automobile fender liner sheet was obtained in the same manner as in Example 1.

Comparative Example 6

Except that the fiber weight per unit area of the nonwoven fabric (layer) was set (changed) to 1,200 g/m², an automobile fender liner sheet as obtained in the same manner as in Example 1.

Comparative Example 7

A sheet for an automobile fender liner was obtained by only executing the lamination step of Example 1 (without executing the forcibly impregnating step). That is, a sheet for an automobile fender liner (see FIG. 1) was obtained by pressing a nonwoven fabric (layer) having a fiber weight per unit area of 800 g/m² formed by PET fibers (polyethylene terephthalate fibers) of 6 decitex and a linear low density polyethylene resin film (LLDPE; melting point of 125° C., melt flow rate of 20 g/10 minutes, 200 g/m²) immediately after being extruded from an extruder (extruding temperature: 200° C.) between a pair of rolls.

Further, the structure (such as the size of the micropore of the olefin resin layer, the air permeability of the entirety of the sheet in the thickness direction, etc.) of the sheet for an automobile interior/exterior material (a sheet for an automobile fender liner, a sheet for an automobile floor mat, a sheet for an automobile interior/exterior material) are shown in Tables 1 to 5.

TABLE 1

|  |  | Ex. 1 | Ex. 2 | Ex. 3 | Ex. 4 | Ex. 5 | Ex. 6 |
|---|---|---|---|---|---|---|---|
| Olefin resin layer | Resin type | LLDPE | LLDPE | LLDPE | LLDPE | LLDPE | LLDPE |
|  | MFR (g/10 min.) | 20 | 30 | 40 | 70 | 20 | 20 |
|  | Formation amount (g/m$^2$) | 200 | 200 | 200 | 200 | 300 | 400 |
|  | Size of micropore (μm) | 100 to 150 | 100 to 200 | 150 to 250 | 300 to 500 | 50 to 150 | 50 to 100 |
| Nonwoven fabric layer | Weight per unit area (g/m$^2$) | 800 | 800 | 800 | 800 | 800 | 800 |
|  | Fineness (decitex) | 6 | 6 | 6 | 6 | 6 | 6 |
| Air permeability of entirety of the sheet (cm$^3$/cm$^2$ · second) |  | 2.8 | 3.5 | 5.6 | 12.1 | 2.1 | 1.5 |
| Resin impregnation method |  | Suction | Suction | Suction | Suction | Suction | Suction |
| Evaluation | Bending strength (N) | 23.2 | 24.1 | 23.9 | 22.3 | 25.6 | 27.4 |
|  | Shearing force (N) | 17.4 | 18.3 | 18.6 | 19.5 | 17.9 | 17 |
|  | Durability test (Stone chipping testing method) | ○ | ○ | ○ | ○ | ○ | ○ |

TABLE 2

|  |  | Ex. 7 | Ex. 8 | Ex. 9 | Ex. 10 | Ex. 11 | Ex. 12 | Ex. 13 |
|---|---|---|---|---|---|---|---|---|
| Olefin resin layer | Resin type | LLDPE | LLDFE | LDPE | LLDPE | LLDPE | LLDPE | LLDPE |
|  | MFR (g/10 min.) | 20 | 20 | 20 | 20 | 20 | 20 | 5 |
|  | Formation amount (g/m$^2$) | 200 | 200 | 200 | 200 | 200 | 200 | 200 |
|  | Size of micropore (μm) | 100 to 150 | 100 to 150 | 50 to 100 | 100 to 150 | 150 to 200 | 200 to 300 | 50 to 100 |
| Nonwoven fabric layer | Weight per unit area (g/m$^2$) | 600 | 400 | 800 | 800 | 800 | 800 | 800 |
|  | Fineness (decitex) | 6 | 6 | 6 | 3 | 15 | 6 | 6 |
| Air permeability of entirety of the sheet (cm$^3$/cm$^2$ · second) |  | 3.0 | 3.8 | 1.6 | 1.4 | 3.6 | 4.7 | 1.8 |
| Resin impregnation method |  | Suction | Suction | Suction | Suction | Suction | Spray | Suction |
| Evaluation | Bending strength (N) | 13.6 | 9.3 | 15.6 | 22.7 | 18.5 | 19.4 | 23.5 |
|  | Shearing force (N) | 18.7 | 17.9 | 17.0 | 18.5 | 16.9 | 20.5 | 16.3 |
|  | Durability test (Stone chipping testing method) | ○ | ○ | ○ | ○ | ○ | ○ | ○ |

TABLE 3

|  |  | Ex. 14 | Ex. 15 | Ex. 16 | Ex. 17 | Ex. 18 | Ex. 19 |
|---|---|---|---|---|---|---|---|
| Olefin resin layer | Resin type | LDPE | LDPE | HDPE | Random PP | HomoPP | HomoPP |
|  | MFR (g/10 min.) | 20 | 20 | 20 | 20 | 20 | 20 |
|  | Formation amount (g/m$^2$) | 200 | 200 | 200 | 200 | 170 | 150 |
|  | Size of micropore (μm) | 350 to 500 | 300 to 300 | 50 to 150 | 50 to 150 | 300 to 600 | 300 to 650 |
| Nonwoven fabric layer | Weight per unit area (g/m$^2$) | 230 | 270 | 800 | 800 | 800 | 800 |
|  | Fineness (decitex) | 6 | 6 | 6 | 6 | 6 | 6 |
| Air permeability of entirety of the sheet (cm$^3$/cm$^2$ · second) |  | 8.2 | 7.2 | 25.1 | 26.3 | 25.2 | 35.3 |
| Resin impregnation method |  | Suction | Suction | Suction | Suction | Suction | Suction |
| Evaluation | Bending strength (N) | 6.7 | 7.8 | 26.5 | 25.9 | 27.0 | 26.5 |
|  | Shearing force (N) | 18.5 | 19.5 | 17.0 | 17.2 | 18.5 | 18.3 |
|  | Durability test (Stone chipping testing method) | ○ | ○ | ○ | ○ | ○ | ○ |

TABLE 4

|  |  | Ex. 20 | Ex. 21 | Ex. 22 | Ex. 23 | Ex. 24 |
|---|---|---|---|---|---|---|
| Olefin resin layer | Resin type | HomoPP | HomoPP | HomoPP | HomoPP | HomoPP |
|  | MFR (g/10 min.) | 20 | 20 | 30 | 20 | 20 |
|  | Formation amount (g/m$^2$) | 130 | 130 | 170 | 170 | 200 |
|  | Size of micropore (μm) | 300 to 700 | 300 to 750 | 300 to 750 | 300 to 700 | 300 to 650 |
| Nonwoven fabric layer | Weight per unit area (g/m$^2$) | 800 | 800 | 800 | 450 | 800 |
|  | Fineness (decitex) | 6 | 6 | 6 | 6 | 6 |
| Air permeability of entirety of the sheet (cm$^3$/cm$^2$ · second) |  | 42.1 | 55.9 | 54.9 | 43.3 | 35.1 |
| Resin impregnation method |  | Suction | Suction | Suction | Suction | Spray |
| Evaluation | Bending strength (N) | 20.2 | 20.1 | 25.9 | 15.1 | 27.0 |
|  | Shearing force (N) | 19.5 | 20.5 | 18.1 | 19.2 | 19.5 |
|  | Durability test (Stone chipping testing method) | ○ | ○ | ○ | ○ | ○ |

TABLE 5

|  |  | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| Olefin resin layer | Resin type | LLDPE | LLDPE | LLDPE | LLDPE | LLDPE | LLDPE | LLDPE |
|  | MFR (g/10 min.) | 0.5 | 110 | 20 | 20 | 20 | 20 | 20 |
|  | Formation amount (g/m$^2$) | 200 | 200 | 50 | 600 | 200 | 200 | 200 |
|  | Size of micropore (μm) | 20 to 100 | 500 to 1200 | 100 to 200 | 10 to 100 | 100 to 200 | 5 to 100 | No micropore was formed |
| Nonwoven fabric layer | Weight per unit area (g/m$^2$) | 800 | 800 | 800 | 800 | 200 | 1200 | 800 |
|  | Fineness (decitex) | 6 | 6 | 6 | 6 | 6 | 6 | 6 |
| Air permeability of entirety of the sheet (cm$^3$/cm$^2$ · second) |  | 0.5 | 25.3 | 12.3 | 0.5 | 6.5 | 1.5 | 0 |
| Resin impregnation method |  | Suction | Suction | Suction | Suction | Suction | Suction | No Suction No spray |
| Evaluation | Bending strength (N) | 23.9 | 21.6 | 18.0 | 27.4 | 4.2 | 31.1 | 23.7 |
|  | Shearing force (N) | 15.0 | 32.1 | 46.4 | 16.1 | 17.9 | 18.4 | 15.8 |
|  | Durability test (Stone chipping testing method) | ○ | ○ | x | ○ | Δ | ○ | ○ |

TABLE 6

| | Sound absorption coefficient | | | | | | |
|---|---|---|---|---|---|---|---|
| | 500 Hz | 630 Hz | 800 Hz | 1000 Hz | 1250 Hz | 1600 Hz | 2000 Hz |
| Ex. 1 | 15 | 22 | 38 | 55 | 68 | 83 | 77 |
| Ex. 2 | 15 | 23 | 35 | 55 | 70 | 80 | 75 |
| Ex. 3 | 16 | 23 | 31 | 45 | 50 | 60 | 69 |
| Ex. 4 | 12 | 21 | 31 | 43 | 60 | 75 | 71 |
| Ex. 5 | 17 | 28 | 51 | 59 | 50 | 45 | 44 |
| Ex. 6 | 17 | 29 | 45 | 55 | 45 | 40 | 42 |
| Ex. 7 | 5 | 12 | 21 | 55 | 63 | 70 | 75 |

TABLE 6-continued

| | Sound absorption coefficient | | | | | | |
|---|---|---|---|---|---|---|---|
| | 500 Hz | 630 Hz | 800 Hz | 1000 Hz | 1250 Hz | 1600 Hz | 2000 Hz |
| Ex. 8 | 5 | 10 | 18 | 44 | 51 | 55 | 55 |
| Ex. 9 | 18 | 30 | 48 | 53 | 60 | 67 | 58 |
| Ex. 10 | 17 | 28 | 42 | 59 | 64 | 70 | 61 |
| Ex. 11 | 13 | 20 | 38 | 52 | 65 | 82 | 85 |
| Ex. 12 | 16 | 20 | 28 | 45 | 56 | 66 | 69 |
| Ex. 13 | 18 | 20 | 42 | 59 | 68 | 67 | 60 |

TABLE 6-continued

| | Sound absorption coefficient | | | | | | |
|---|---|---|---|---|---|---|---|
| | 500 Hz | 630 Hz | 800 Hz | 1000 Hz | 1250 Hz | 1600 Hz | 2000 Hz |
| Com. Ex. 1 | 8 | 10 | 20 | 39 | 74 | 36 | 30 |
| Com. Ex. 2 | 10 | 15 | 21 | 25 | 32 | 42 | 55 |
| Com. Ex. 3 | 12 | 18 | 19 | 32 | 39 | 52 | 69 |
| Com. Ex. 4 | 8 | 8 | 18 | 35 | 50 | 30 | 23 |
| Com. Ex. 5 | 6 | 7 | 19 | 38 | 48 | 41 | 30 |
| Com. Ex. 6 | 18 | 33 | 55 | 53 | 57 | 63 | 60 |
| Com. Ex. 7 | 6 | 8 | 18 | 30 | 70 | 35 | 15 |

TABLE 7

| | Sound absorption coefficient | | | | | | | | | | | |
|---|---|---|---|---|---|---|---|---|---|---|---|---|
| | 500 Hz | 630 Hz | 800 Hz | 1000 Hz | 1250 Hz | 1600 Hz | 2000 Hz | 2500 Hz | 3150 Hz | 4000 Hz | 5000 Hz | 6300 Hz |
| Ex. 14 | 5 | 13 | 25 | 33 | 39 | 62 | 91 | 80 | 71 | 65 | 60 | 55 |
| Ex. 15 | 6 | 15 | 26 | 33 | 40 | 64 | 92 | 83 | 72 | 67 | 60 | 57 |
| Ex. 16 | 9 | 15 | 17 | 28 | 40 | 55 | 72 | 86 | 91 | 82 | 64 | 55 |
| Ex. 17 | 9 | 13 | 15 | 22 | 35 | 51 | 70 | 83 | 96 | 88 | 70 | 62 |
| Ex. 18 | 8 | 14 | 16 | 25 | 38 | 55 | 70 | 86 | 95 | 84 | 70 | 64 |
| Ex. 19 | 8 | 12 | 14 | 21 | 33 | 50 | 68 | 83 | 90 | 82 | 72 | 68 |
| Ex. 20 | 7 | 10 | 13 | 19 | 25 | 36 | 50 | 64 | 80 | 86 | 89 | 83 |
| Ex. 21 | 7 | 11 | 12 | 18 | 25 | 35 | 47 | 65 | 76 | 85 | 93 | 92 |
| Ex. 22 | 7 | 11 | 13 | 19 | 24 | 33 | 47 | 66 | 75 | 84 | 94 | 91 |
| Ex. 23 | 5 | 8 | 11 | 15 | 22 | 30 | 45 | 66 | 76 | 80 | 85 | 75 |
| Ex. 24 | 8 | 12 | 15 | 22 | 32 | 51 | 66 | 81 | 89 | 82 | 73 | 67 |

Each automobile interior/exterior material (shaped body) obtained by subjecting each of sheets for an automobile interior/exterior material to thermoforming was evaluated based on the following evaluation method. The results are shown in Tables 1 to 7.

<Bending Strength Evaluation Method>

According to JIS K7171-2008, as for a test piece (width 50 mm, length 200 mm), the bending load (bending strength) (N) was measured using a flexural property tester. The measurement conditions were: the test speed of 50 mm/minute, the fulcrum distance of 100 mm, the shape of the pressing jig of R=5 mm, and the shape of the fulcrum of R=5 mm.

<Shearing Force Evaluation Method (Anti-Icing Property Evaluation Method)>

After strongly fixing a sheet for an automobile interior/exterior material on a base with the surface on the olefin resin layer 3 side facing up, a stainless ring (a short tube; the inner diameter of 50 mm, the height of 40 mm) was placed on the resin layer 3 and the ring was filled with water and frozen. Next, the ice attached by applying load to the ring from side directions (horizontal direction; shearing direction) was detached from the sheet for an automobile interior exterior material. Then, the maximum load (shearing force) up to the detachment was measured. It can be said that the smaller the shearing force, the better the anti-icing performance.

<Durability Evaluation Method (Stone Chipping Testing Method)>

To find the durability (durability when stones splashed by tires collide) of mainly the surface of the olefin resin layer 3 side of the automobile interior/exterior material, the durability was evaluated using the "Stone chipping evaluation method" stipulated in JASO M104 (Standards of Society of Automotive Engineers of Japan, Inc.). Evaluation was made in the three stages based on the following criteria.

"○": No peeling occurred in the olefin resin layer and excellent in durability

"Δ": There were a few places where the olefin resin layer was starting to peel

"X": Olefin resin layer was peeling off and had poor durability

<Sound Absorption Coefficient Measurement Method>

The reverberation room sound absorption coefficient was measured according to ISO354. The measured range was a range of 200 Hz to 6,300 Hz.

As it is apparent from Tables, the automobile interior/exterior material made using the sheet for an automobile interior/exterior material of Examples 1 to 24 according to the present invention (a sheet for an automobile fender liner, a sheet for an automobile floor mat, a sheet for an automobile interior/exterior material) was capable of sufficiently absorbing sounds in a range of 500 Hz to 1,200 Hz as well as sounds in a slightly higher frequency range of 1,200 Hz to 2,000 Hz, and excellent sound-absorbing performance could be obtained. Further, the sheet for an automobile interior/exterior material of Examples 1 to 24 had excellent anti-icing properties and the resin layer did not peel even after spattering of rocks and had excellent durability.

Furthermore, the automobile interior/exterior material made using the sheet for an automobile interior/exterior material of Examples 17 to 24 according to the present invention was capable of further absorbing sounds in a high frequency range (5,000 Hz to 6,300 Hz).

On the other hand, in Comparative Example 1 in which the melt flow rate of the low density polyethylene resin (olefin resin) was less than 1 g/10 minutes, almost no micropore was formed, air permeability was low, and the sound-absorbing performance in between 1,600 Hz to 2,000 Hz was insufficient. Further, in Comparative Example 2 in which the melt flow rate of the resin was more than 90 g/10 minutes, air permeability was too large, and sufficient sound-absorbing performance between 1,000 Hz to 1,250 Hz could not be obtained.

In addition, in Comparative Example 3 in which the formation amount of the low density polyethylene resin layer (olefin resin layer) was less than 100 g/m², peeling of the resin layer occurred due to spattering rocks and the durability was poor and the anti-icing property was insufficient. In Comparative Example 4 in which the formation amount of the low density polyethylene resin layer (olefin resin layer) was more than 500 g/m², the air permeability of the entirety of the sheet was less than 1 (cm³/cm²·second) and sufficient sound-absorbing performance could not be obtained between 1,600 Hz to 2,000 Hz.

In Comparative Example 5 in which the fiber weight per unit area of the nonwoven fabric layer was less than 220 g/m², sufficient bending strength could not be obtained, and rigidity was poor. In Comparative Example 6 in which the fiber weight per unit area of the nonwoven fabric layer was more than 1000 g/m², there was no problem with the properties of sound-absorbing performance, etc., but there were problems such as increase in cost and increase in mass (lightness is not ensured).

Further, in the Comparative Example 7 in which suction and spraying was not performed for the laminated sheet, no micropore was formed, and the air permeability of the entirety of the sheet was 0 (cm³/cm²·second), and the absorption at 2,000 Hz was significantly reduced.

INDUSTRIAL APPLICABILITY

The sheet for an automobile interior/exterior material according to the present invention can be formed in a predetermined shape and used as an automobile external material such as an automobile fender liner, etc., or an automobile inner material such as an automobile floor mat, etc. By being used in this manner, sounds such as noise, etc., can be sufficiently absorbed.

Further, the automobile interior/exterior material has excellent anti-icing properties since snow and ice are less likely to get fixed, and can be suitably used as an automobile fender liner. For example, the sheet for an automobile fender liner according to the present invention can be formed in a predetermined shape (a shape compatible with the inner peripheral surface of the wheelhouse, etc.) and attached to the wheelhouse of the automobile) to be used. By being used in this manner, noise caused by driving an automobile (road noise, collision sounds, etc., of rocks, sand, etc.) can be sufficiently absorbed, snow and ice are less likely to get fixed and the anti-icing property is excellent.

The present application claims priority to Japanese Patent Application No. 2016-29866 filed on Feb. 19, 2016, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention. The present invention allows any design changes unless departing from its spirit within the scope of the claims.

DESCRIPTION OF REFERENCE SYMBOLS

1: sheet for an automobile interior/exterior material
2: nonwoven fabric layer
3: olefin resin layer
4: laminated sheet
20: automobile interior/exterior material
31: suction treatment tank
32: exhaust tube
33: air permeable suction nozzle

The invention claimed is:

1. A sheet for an automobile interior/exterior material, comprising:
a nonwoven fabric layer in which a fiber weight per unit area is 220 g/m² to 1,000 g/m²; and
an olefin resin layer laminated on one of surfaces of the nonwoven fabric layer, wherein
a formation amount of the olefin resin layer is in a range of 100 g/m² to 500 g/m²,
a melt flow rate of the olefin resin layer is in a range of 1 g/10 minutes to 90 g/10 minutes,
at least a part of a resin of the olefin resin layer is impregnated in the nonwoven fabric layer,
a plurality of micropores is formed in the olefin resin layer, and
air permeability of an entirety of the sheet for an automobile interior/exterior material in a thickness direction is in a range of 1 to 60 (cm³/cm²·second).

2. The sheet for an automobile interior/exterior material as recited in claim 1, wherein
the fiber weight per unit area of the nonwoven fabric layer is 300 g/m² to 1,000 g/m²,
the olefin resin layer is a low density polyethylene resin layer, and
the air permeability of the entirety of the sheet for an automobile interior/exterior material in the thickness direction is in a range of 1 to 20 (cm³/cm²·second).

3. The sheet for an automobile interior/exterior material as recited in claim 2, wherein the low density polyethylene resin layer is a linear low density polyethylene resin layer.

4. The sheet for an automobile interior/exterior material as recited in claim 1, wherein the melt flow rate of the olefin resin is in a range of 1 g/10 minutes to 40 g/10 minutes.

5. The sheet for an automobile interior/exterior material as recited in claim 1, wherein a size of the micropore is in a range of 50 μm to 1,000 μm.

6. The sheet for an automobile interior/exterior material as recited in claim 1, wherein a thickness of the fiber constituting the nonwoven fabric layer is 2 decitex to 17 decitex, and the fiber weight per unit area of the nonwoven fabric layer is 500 g/m² to 800 g/m².

7. The sheet for an automobile interior/exterior material as recited in claim 1, wherein the air permeability of the entirety of the sheet for an automobile interior/exterior material in the thickness direction is in a range of 1 to 5 (cm³/cm²·second).

8. The sheet for an automobile interior/exterior material as recited in claim 1, wherein the formation amount of the olefin resin layer is in a range of 150 g/m² to 300 g/m².

9. An automobile interior/exterior material obtained by forming the sheet for an automobile interior/exterior material as recited in claim 1.

10. A method of producing an automobile interior/exterior material, comprising:
thermoforming the sheet for an automobile interior/exterior material as recited in claim 1.

11. A method of producing a sheet for an automobile interior/exterior material, comprising:
a lamination step for forming a laminated sheet in which an olefin resin layer having a melt flow rate of 1 g/10 minutes to 90 g/10 minutes is laminated on one of surfaces of a nonwoven fabric layer in which a fiber weight per unit area is 220 g/m² to 1,000 g/m² so that a formation amount of the olefin resin layer is 100 g/m² to 500 g/m²; and
a forcibly impregnating step for obtaining a sheet for an automobile interior/exterior material in which air permeability in a thickness direction is 1 to 60 (cm³/cm²·second) by impregnating at least a part of the olefin resin in the nonwoven fabric layer by suctioning a gas in the nonwoven fabric layer from the other surface side of the nonwoven fabric layer in a state in which the olefin resin is softened or melted by heating to form a number of micropores in the olefin resin layer.

12. A method of producing a sheet for an automobile interior/exterior material, comprising:

a lamination step for forming a laminated sheet in which an olefin resin layer having a melt flow rate of 1 g/10 minutes to 90 g/10 minutes is laminated on one of surfaces of a nonwoven fabric layer in which a fiber weight per unit area is 220 g/m$^2$ to 1,000 g/m$^2$ so that a formation amount of the olefin resin layer is 100 g/m$^2$ to 500 g/m$^2$; and a forcibly impregnating step for obtaining a sheet for an automobile interior/exterior material in which air permeability in a thickness direction is 1 to 60 (cm$^3$/cm$^2$·second) by impregnating at least a part of the olefin resin in the nonwoven fabric layer by spraying a gas against a surface of the olefin resin layer in a state in which the olefin resin is softened or melted by heating to form a number of micropores in the olefin resin layer.

13. The method of producing a sheet for an automobile interior/exterior material as recited in claim 11, wherein the fiber weight per unit area of the nonwoven fabric layer is 300 g/m$^2$ to 1,000 g/m$^2$, the olefin resin layer is a low density polyethylene resin layer, and the air permeability of the entirety of the sheet for an automobile interior/exterior material in the thickness direction is in a range of 1 to 20 (cm$^3$/cm$^2$·second).

14. The method of producing a sheet for an automobile interior/exterior material as recited in claim 13, wherein the low density polyethylene resin layer is a linear low density polyethylene resin layer.

15. The method of producing a sheet for an automobile interior/exterior material as recited in claim 11, wherein the melt flow rate of the olefin resin is in a range of 1 g/10 minutes to 40 g/10 minutes.

16. The method of producing a sheet for an automobile interior/exterior material as recited in claim 11, wherein the thickness of the fiber constituting the nonwoven fabric layer is 2 decitex to 17 decitex, the fiber weight per unit area of the nonwoven fabric layer is 500 g/m$^2$ to 800 g/m$^2$, and a size of the micropore is in a range of 50 μm to 1,000 μm.

17. A method of producing an automobile interior/exterior material, comprising:

thermoforming a sheet for an automobile interior/exterior material produced by the method as recited in claim 11.

* * * * *